United States Patent
Winter et al.

(10) Patent No.: US 9,294,289 B2
(45) Date of Patent: Mar. 22, 2016

(54) METHOD AND SYSTEM FOR SERVICE MANAGEMENT FOR TERMINALS WITH BROADBAND CONNECTIONS

(75) Inventors: Rolf Winter, Heidelberg (DE); Hans-Joerg Kolbe, Darmstadt (DE)

(73) Assignee: NEC EUROPE LTD., Heidelberg (DE)

( * ) Notice: Subject to any disclaimer, the term of this patent is extended or adjusted under 35 U.S.C. 154(b) by 283 days.

(21) Appl. No.: 13/513,628

(22) PCT Filed: Dec. 4, 2009

(86) PCT No.: PCT/EP2009/008691
§ 371 (c)(1),
(2), (4) Date: Jul. 25, 2012

(87) PCT Pub. No.: WO2011/066849
PCT Pub. Date: Jun. 9, 2011

(65) Prior Publication Data
US 2012/0281577 A1 Nov. 8, 2012

(51) Int. Cl.
| | |
|---|---|
| *G01R 31/08* | (2006.01) |
| *H04L 12/12* | (2006.01) |
| *H04L 12/28* | (2006.01) |
| *H04L 12/24* | (2006.01) |

(52) U.S. Cl.
CPC ............ *H04L 12/12* (2013.01); *H04L 12/2834* (2013.01); *H04L 12/2856* (2013.01); *H04L 41/0816* (2013.01); *H04L 41/0833* (2013.01); *Y02B 60/34* (2013.01); *Y02B 60/36* (2013.01); *Y02B 60/41* (2013.01)

(58) Field of Classification Search
USPC .......... 370/252, 401, 409, 430, 463; 709/203; 375/222
See application file for complete search history.

(56) References Cited

U.S. PATENT DOCUMENTS

| | | | |
|---|---|---|---|
| 6,721,355 B1* | 4/2004 | McClennon | H04L 12/10 375/222 |
| 7,369,566 B2* | 5/2008 | Deczky | H04L 1/0017 370/430 |
| 2004/0085969 A1* | 5/2004 | Chen et al. | 370/397 |
| 2005/0254515 A1* | 11/2005 | Suzuki | H04L 12/12 370/463 |
| 2006/0028980 A1* | 2/2006 | Wright | H04L 12/5692 370/229 |

(Continued)

FOREIGN PATENT DOCUMENTS

| | | |
|---|---|---|
| CN | 1553628 A | 12/2004 |
| JP | 2005323301 A | 11/2005 |

(Continued)

OTHER PUBLICATIONS

Brett Handley Multi-Service Access Nodes (MSANs): Gateways to Next Generation Network (NGN)—Apr. 13, 2006 hereafter Handley.*

(Continued)

*Primary Examiner* — Jael Ulysse
(74) *Attorney, Agent, or Firm* — Young & Thompson

(57) ABSTRACT

A method for service management for terminals with broadband connections, wherein the terminal is connected through a home gateway to a service connected in an operator network, the home gateway being attached to an access node of the operator network, includes the steps of monitoring whether the terminal is temporarily not using the service, delegating the service and transferring its current status and/or data to the access node, and tearing down the connection between the home gateway and the access node while operating the service in the delegated service host.

20 Claims, 2 Drawing Sheets

(56) References Cited

U.S. PATENT DOCUMENTS

Figure 1:
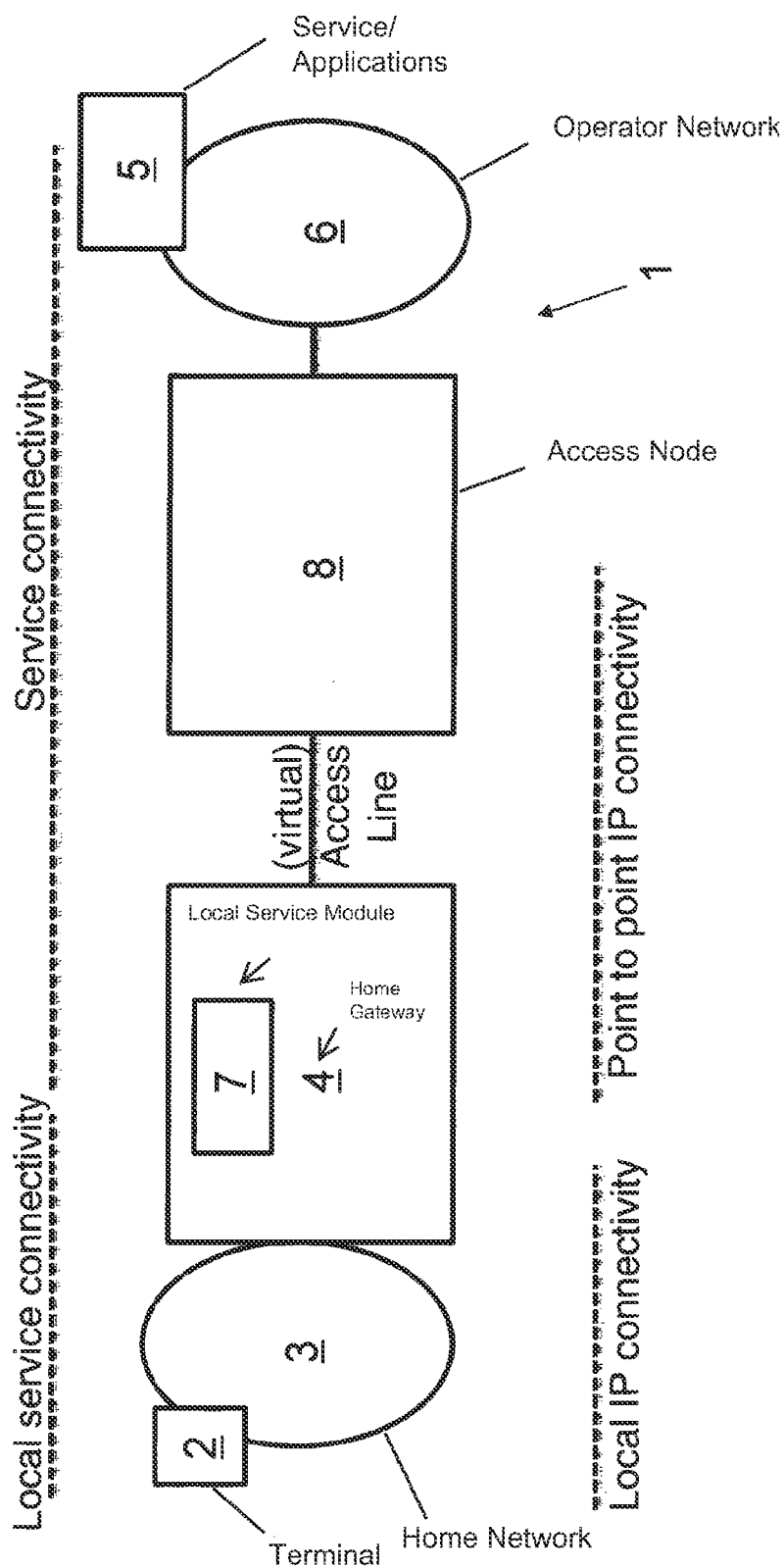

| | | | |
|---|---|---|---|
| 2006/0274764 A1* | 12/2006 | Mah | H04M 11/062 370/401 |
| 2007/0025341 A1* | 2/2007 | Baigal | H04L 41/0213 370/352 |
| 2007/0147292 A1* | 6/2007 | Van Ewijk et al. | 370/329 |
| 2007/0218861 A1* | 9/2007 | Walston | 455/343.4 |
| 2008/0002711 A1* | 1/2008 | Bugenhagen | H04W 28/18 370/395.2 |
| 2008/0144494 A1* | 6/2008 | Casey | 370/230 |
| 2008/0165789 A1* | 7/2008 | Ansari | G06Q 30/04 370/401 |
| 2008/0285577 A1* | 11/2008 | Zisapel et al. | 370/409 |
| 2008/0298444 A1* | 12/2008 | Cioffi | H04L 41/0823 375/222 |
| 2009/0036159 A1* | 2/2009 | Chen | H04L 12/2856 455/556.1 |
| 2009/0156213 A1* | 6/2009 | Spinelli | H04W 36/36 455/436 |
| 2009/0279701 A1* | 11/2009 | Moisand | H04L 12/185 380/270 |
| 2011/0299579 A1* | 12/2011 | Cioffi et al. | 375/222 |
| 2012/0131165 A1* | 5/2012 | Baniel | H04L 47/10 709/223 |

FOREIGN PATENT DOCUMENTS

| | | |
|---|---|---|
| JP | 2008211343 A | 9/2008 |
| JP | 2009212932 A | 9/2009 |

OTHER PUBLICATIONS

International Search Report, dated Aug. 13, 2010, from corresponding PCT application.

* cited by examiner

METHOD AND SYSTEM FOR SERVICE MANAGEMENT FOR TERMINALS WITH BROADBAND CONNECTIONS

The present invention relates to a method and a system for service management for terminals with broadband connections, wherein said terminal is connected through a home gateway to at least one service connected in an operator network, said home gateway—original service host—being attached to an access node of said operator network.

Global warming and pollution require saving energy wherever possible. This demand applies increasingly to broadband access as well, since it has moved from dial-up like behavior to an "always" connected mode. Being always connected to the network that carries services comes with the benefit of fast service setup times and the possibility to be reachable from the network at any time, as e.g. being required for telephony or emergency warning services. The problem with this "always on" approach is that the device inside the customer premises, typically the local gateway or home gateway, such as a modem or router, keeps the physical connection towards the access node established and stays in full operational mode. This permanently consumes some watts of power on both ends of the access connection per subscriber even if the connection is not actively used by the customer (i.e. only provides reachability in case a service is "activated" from outside, e.g. telephony). Multiplying this value by the number of deployed broadband access lines clearly leads to an unacceptable waste of energy.

There are a number of approaches that address power savings in a broadband access environment. For instance, efforts in the ITU have lead to the definition of several low power states for e.g. xDSL (Digital Subscriber Line) and xPON (Passive Optical Network). These efforts, which range from full shutdown of devices and lines to different states of sleep modes, are described for instance in Elmar Trojer, Per Erik Eriksson, "Power Saving Modes for GPON and VDSL2".

Another solution is described in U.S. Pat. No. 7,369,566 A1, which addresses a specific power save mode. When data between a transmitter and a receiver is transmitted at a reduced rate of the data transmission, a mode with reduced power for data transmission is established, i.e. DSL modems are rate-adapted to use the lowest possible rate for a given traffic pattern in order to save power. A similar approach is disclosed in U.S. Pat. No. 6,721,355 B1.

According to still another solution that is described in US 2006/0274764 A1 parts of a device that do not handle always-on services are temporarily switched off, whereas always-on services, such as telephony, are always kept powered.

US 2007/0218861 A1 describes a specific method and system for increasing power savings in a DOCSIS (Data Over Cable Service Interface Specification) modem, which focuses on leveraging power savings potential in the base technology.

The still unresolved problem however is the loss of reachability from the network side for services and applications hosted in the customer premises network (e.g. telephony). Depending on the deployment scenario (BRAS-centric vs. layer-3 model), also network attachment specific procedures and keepalive methods need to be treated in case endpoint and/or access lines get shut down. While all solutions mentioned above address a way to save energy, in case they allow the whole access line including the home gateway to go to sleep, however, they loose maintenance of the availability of the always-on services or applications.

It is therefore an object of the present invention to improve and further develop a method and a system for service management for terminals with broadband connections of the initially described type in such a way that significant energy savings are achieved, whereas at the same time services and applications that can be triggered from outside still work while the access line can be put to sleep or into a low power mode.

In accordance with the invention, the aforementioned object is accomplished by a method comprising the features of claim 1. According to this claim, such a method is characterized in the steps of monitoring whether said terminal is temporarily not using said at least one service, delegating said at least one service and transferring its current status and/or data to said access node or an associated entity—delegated service host—, and tearing down the connection between said home gateway and said access node while operating said service in said delegated service host.

Furthermore, the aforementioned object is accomplished by a system comprising the features of independent claim 14. According to this claim, such a system is characterized in that that the system includes means for monitoring whether said terminal is temporarily not using said at least one service, delegation means for delegating said at least one service and transferring its current status and/or data to said access node or an associated entity—delegated service host—, and a mechanism for tearing down the connection between said home gateway and said access node while operating said service in said delegated service host.

According to the invention it has first been recognized that existing solutions for saving energy in connection with the deployment of terminals with broadband connections suffer from the problem that the reachability of the home network from outside is getting lost in case the access line, the home gateway and/or the terminal itself are shutdown. For instance, in case a home gateway is e.g. turned off, there is no possibility for a service in an operator network (which in the sequel is more generally referred to as NGN—Next Generation Network) to determine where the home gateway is and that it needs to wake up.

As a solution, the present invention proposes to delegate services that require permanent reachability from the NGN side to the access node, which is never turned off, prior to shutting down (parts of) the home gateway. More specifically, according to the present invention the connection towards the access node is monitored to detect whether a service is currently actively used by the customer or not. Upon detecting that the conditions to shut down the access line and/or the home gateway are fulfilled (e.g. depending on predefined or dynamically adapting policies), the service that is currently not used is delegated and its current status and/or data is transferred to the access node or to another entity in the NGN, which in the sequel is referred to as delegated service host. In other words, the delegated service takes over the tasks and procedure of the original service towards the NGN. For instance, the delegation may be implemented by using an XML (Extensible Markup Language) structure. As a result of the delegation, the service is operated in said delegated service host, and the IP session between the access node and the home gateway can be torn down. This allows tearing down the underlying layer 2 and layering 1 connection. Shutting down this connection significantly reduces the energy footprint of the broadband access on both the operator and customer side. The outsourcing of services/applications and the transfer of their states from a device in the customer premises network to a network entity (e.g. access node) in the operator domain enables effective power saving without losing connectivity and reachability of the services/applications.

The term "service" is to be understood in a broad sense and it is in no way intended to limit the scope of the present invention. The solution according to the present invention is independent of which specific services are online. In particular, the services include applications that are delivered towards the users (e.g. VoIP) as well as applications for network management and attachment. Further, although the term "home gateway" is commonly used for residential users, it is in no way intended to limit the scope of the present invention to such use cases. In particular, the term "home gateway" also applies for business and/or enterprise users or for any other such applications.

The method according to the present invention can be implemented without any special efforts, since it is a local method that only requires the deployment of software components in the delegated service host (e.g. an access node in the operator domain) and in the home gateway of the local customer network. Further, the method may employ power and memory processing means provided in the access node. The rest of the network can remain untouched.

According to a preferred embodiment the terminal and/or the home gateway may be powered down or run in a low power mode after the service has been delegated to the delegated service host. Despite of the fact that the devices are shut down, the reachability and connectivity of the service is still guaranteed due to the outsourcing of the service to the delegated service host.

In a specific embodiment a local service module is provided that maintains the terminal's connection to the operator network. In such implementation, the terminal has to establish only local service connectivity, i.e. it connects only locally to the local service module, whereas the connectivity to the service is managed by the local service module. However, in case a non-IP terminal such as a legacy phone connects directly to the home gateway, there is no IP-based local service connectivity in place and the service is always embedded in the home gateway.

With respect to a seamless operation, it may be provided that the delegated service in the delegated service host answers requests from the operator network on behalf of the temporarily unavailable service in the home gateway. For instance, the delegated service host may take care of answering keepalive messages to make the NGN aware of the fact that the customer (or his terminal, respectively) is still reachable although the terminal is powered off.

In a specific application scenario it may be provided that the delegated service in the delegated service host rejects a request from the operator network on the basis of whitelists and/or blacklists. For instance in case of a VoIP service, it may prove beneficial to keep the terminal (and the home gateway, as the case may be) powered down or in a low power mode when a call is directed to the terminal that originates from a blacklisted device. Such a request can be rejected by the delegated service host on behalf of the temporarily unavailable service in the home gateway, thereby increasing the energy saving potential.

According to another embodiment applying to communication services, such as VoIP, the delegated service in the delegated service host may request an entity that directs a call to the unavailable terminal to call back. By this means the system gains a certain amount of time that can be used to wake up the shutdown terminal and to initiate and accomplish the re-delegation of the communication service to the home gateway or the terminal, respectively.

Generally, it proves to be beneficial to include an identifier in messages that are sent from the delegated service on behalf of the temporarily unavailable service in the home gateway. The identifier can be used to indicate that the delegated service host has taken over the service on behalf of the original service host. By this means a seamless communication with the service is facilitated. Moreover, the fact that the wakeup and re-delegation procedure might take some time results in a certain waiting time for a requesting party that e.g. directs a voice call to the unavailable terminal. By indicating the fact of the service delegation in messages directed to the requesting party, the requesting party becomes aware of the reason for the delay, which may help to enhance the user acceptance.

According to another preferred embodiment, local policies and/or filters may be provided for detecting within the delegated service whether interaction with the original service host is required and/or desirable. For instance, the policy rules may have been learnt from the original service and may include e.g. whitelists for callers who would be allowed to wake up a home network during night-time, or to reject spam calls.

According to another preferred embodiment policy rules may be implemented in the delegated service host for controlling the re-establishing of the connection between the home gateway and the access node dependent on the occurrence of specific events. For instance, policy rules may be specified in the access node, which prohibit wakeup in case e.g. an arriving call has been identified as being a spam call.

With respect to tearing down a connection, it may be provided that assigned IP addresses are delegated back to the access node, wherein changes of IP address assignment are handled accordingly in the service. This means that when transferring a service and shutting down an access connection, this may also include giving the assigned IP address of the home gateway back to the access node. If there is a need to change the IP address in the meantime (while the service is being transferred), that change needs to be handled by the service.

In connection with re-establishing the connection between the home gateway and the access node, i.e. when the service goes back to the home gateway, it takes the assigned IP address with it. Consequently, it may happen that the home gateway is assigned the same IP address it had prior to tearing down said connection. Alternatively, it may be assigned a new IP address with the transferred service being already registered in the NGN with that one.

With respect to an optimal operation of the outsourced service, it may be provided that possible targets for the delegated service host are discovered depending on specific requirements of the service. For instance, a Voice over IP service might be implemented in a BRAS (Broadband Remote Access Server) while an emergency service may be implemented in an MSAN (Multiservice Access Node). This is a common approach when using different overlay networks (e.g., VPNs, virtual private networks) per service. The voice network would then use a BRAS as gateway while emergency warning services may use the local MSAN.

Generally, it is most suitable to select an entity to become the delegated service host that is located at a point in the operator network where as many as possible packets that are relevant for the terminal and its local network are passing by. In that way, the chance that important packets will be missed by the delegated service host is reduced as far as possible. Additionally, in the selection process of the delegated service host existing trust relationship may be re-used.

With respect to a specific system implementation it may be provided that the home gateway itself is attached to an access node, which can be represented by an MSAN/DSLAM (Multiservice Access Node/Digital Subscriber Line Access Multiplexer). In such case the connection established between the access node and the home gateway would be a physical access line. Alternatively, the access node may be represented by a BRAS. In such case the traffic may be tunneled towards the BRAS, and the access line from an IP perspective becomes a virtual one. That is, implementations in layer-3 AN scenarios and BRAS-centric scenarios are possible, the latter also in a distributed model where the MSAN takes over the service while operating only in layer 2 mode.

According to an advantageous embodiment a hybrid system implementation may be realized in which the access node is represented per service depending on the used service overlay network. For instance, depending on the used service overlay network the access node may be represented by either one or more BRASes or by one or more MSANs/DSLAMs.

There are several ways how to design and further develop the teaching of the present invention in an advantageous way. To this end, it is to be referred to the patent claims subordinate to patent claims 1 and 14 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 schematically illustrates an access network setup with services according to the state of the art, and FIG. 2 schematically illustrates an embodiment of a system according to the present invention with delegation of a service to an access node.

Figure 2:
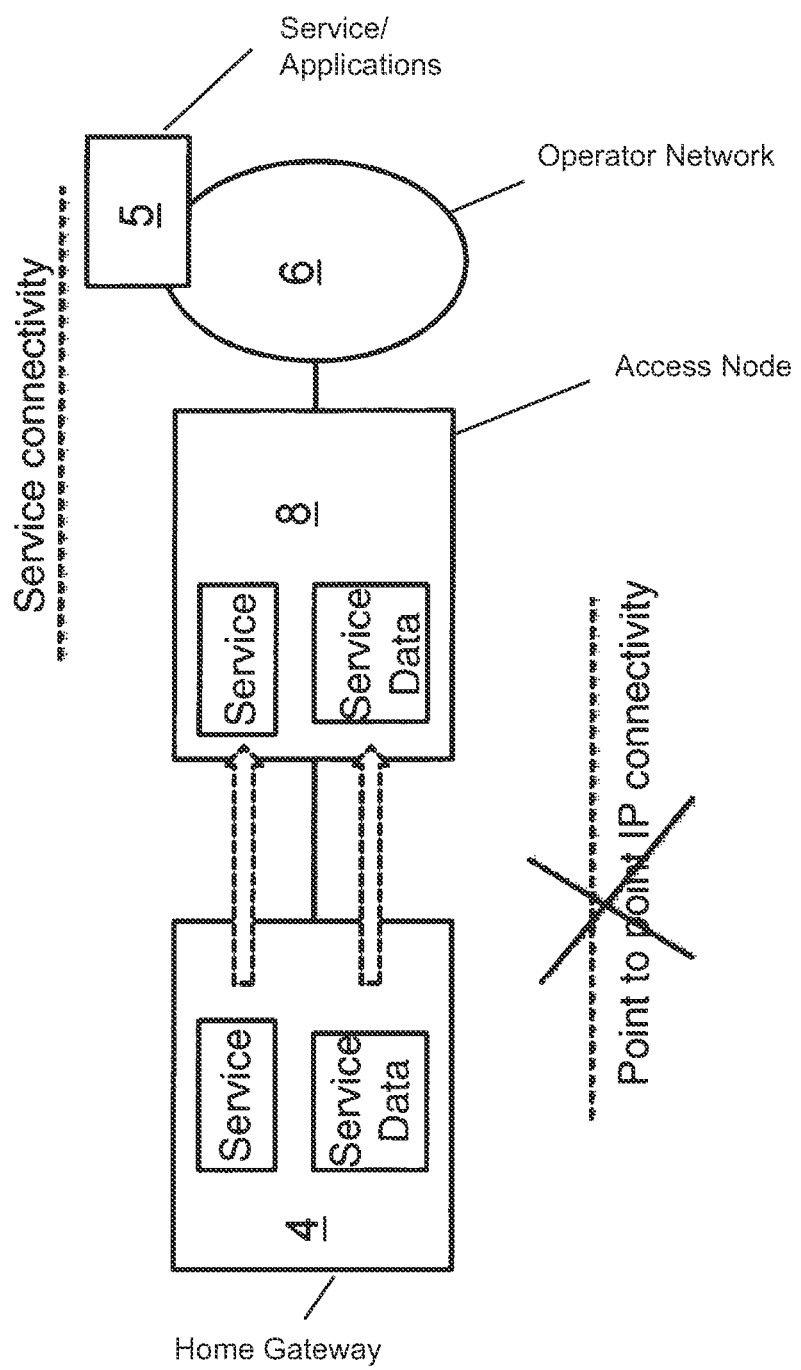

The system depicted in FIG. 1 is a prior art fixed line access network 1 that allows terminals 2 that are located in a home network 3 to connect through a home gateway (HGW) 4 to services/applications 5 connected in an operator network (NGN) 6. In many cases they connect to or through a local service module 7. The local service module 7 maintains the connection to the NGN 6 while the terminal 2 only connects locally. In case a non-IP device such as a legacy phone connects directly to the HGW 4, there is no IP-based local service connectivity in place and the service is always embedded in the HGW 4.

The HGW 4 itself is attached to an access node (AN) 8, which can be represented by an MSAN/DSLAM or in the BRAS-centric model, as described in Hellberg, Greene, Boyes, "Broadband Network Architectures: Designing and Deploying Triple-Play Services", in Prentice Hall; 1 edition (May 11, 2007), by a Broadband Remote Access Server. The characteristic of both models is that the AN 8 is the owner of the IP address that the HGW 4 uses to communicate with the AN 8.

Devices inside the home network 3 also communicate using this IP address since the HGW 4 translates their IP addresses to its own address using network address and port translation (NA(P)T) methods.

In case the HGW 4 connects to an MSAN/DSLAM, the access line shown in FIG. 1 is a physical existing one. In case the traffic is tunneled towards a BRAS, the access line from an IP perspective becomes a virtual one. Without loss of generality, the following descriptions refer to the MSAN/DSLAM case, wherein BRAS-specific issues are addresses when needed.

The normal mode of operation is as follows: The HGW 4 has attached to the AN 8 and received an IP address from it. The AN 8 is the "owner" of the IP address. Routing from the NGN 6 is directly heading towards the AN 8. The HGW 4 has performed the network attachment procedure and exchanges keepalives with the AN 8, such as PPP (Point-to-Point Protocol) hellos or BFD (Bidirectional Forwarding Detection) frames.

The terminal 2 attached locally to the HGW's 4 service (in the IP and non-IP device case) and the service attaches to the hosted central service 5. An example for this is a SIP client registering to a local registrar in the HGW 4 while the HGW's 4 Back-to-back user agent itself registers to the SIP server or IMS. The HGW 4 translates the requests from and to the terminals 2.

In order to save energy when services are not in active use, prior art approaches in standardization organizations like e.g., ITU-T or HGI, define different stages of shutdown modes according to which procedures can be as follows:

The HGW 4 or another entity detects that the services 5 had not been used.
The HGW 4 triggers the terminals 2 to shut down (using e.g. wake-on-LAN technologies)
The HGW 4 shuts down or reduces power on the access line
The HGW 4 itself goes into a sleep mode or full power-off mode.

In case a terminal 2 wakes up based on e.g., user interaction, it could "wake up" the HGW 4 and force the network attachment to be re-established and the local service module 7 to register the service 5 and set up a session.

The problem is the reachability of the home network 3 from outside. In case the HGW 4 is e.g. turned off, there is no possibility for a service 5 in the NGN 6 to determine where it is and that it needs to wake up.

The present invention delegates the services that require permanent reachability from the NGN 6 side prior to shutting down (parts of) the HGW 4 to the AN 8 which is never turned off. The outsourced service 5 answers to all re-registration or keepalive methods from the NGN 6 although the destination terminal 2 itself is not reachable. In case a request arrives from the NGN 6, the AN 8 triggers the HGW 4 to switch back to a fully operational mode. Having done that, it re-installs the service including the state. This applies for services to users and also to network services such as the network attachment.

In the following, a specific application scenario of the present invention is described in connection with FIG. 2. Same reference numerals indicate the same elements as explained in connection with FIG. 1. In detail, the outsourcing of services, the operation on behalf of the shut down terminal 2 and the re-installation of the service 5 on the HGW 4 will be explained.

1) Moving a Service

Upon detecting that the conditions to shut down the access line and/or the HGW 4 are fulfilled (e.g. because the access line had not been actively used for a predetermined length of time), the following steps are executed between the HGW 4 and the AN 8. The numbers of the following steps are indicated in FIG. 2.

1) The local service module 7 gets delegated to the AN 8. Alternatively, it can be pre-installed there (especially in the case where implementations differ depending on where it is hosted e.g., due to different software execution frameworks).
2) The current service data/state is delegated to the AN 8, e.g. using an XML structure.
3) The IP session between the AN 8 and HGW 4 is torn down.
4) The service module 9 in the AN 8 takes over the service using the same IP address and ports that the service in the HGW 4 used As an example, a SIP service can be delegated, shifting the information of the current registrations including all kinds of session specific parameters/data.

2) Service Operation

The delegated service takes over the operation, taking care of answering keepalives messages to make the NGN 6 aware of the fact that the customer is still reachable (although his terminal 2 has been shut down). To do so, the service accesses and modifies the transferred data (e.g. session parameters/cookies). An example can be the takeover of a SIP session registration and re-registering the service periodically according to the required interval.

A specific case is the network attachment service. In case the service is not delegated to the device that issued the IP address but is in the path of a layer-2 tunnel towards this device, it can take over the NASS (Network Attachment Sub-System) signaling such as PPP keepalives or BFD frame answers. A further state that may need to be transferred is the status of the NA(P)T binding in the home gateway in order to reach devices inside a home network.

Upon detecting a service request from the NGN 6 (e.g. a SIP invite), the service decides based on local filters whether it is required to move the service back and forward the request to the HGW 4. In that case, the AN 8 may answer to the NGN 6 with a message indicating that answering the request is in progress. The local filters can include policies learnt from the original service like e.g., whitelists for callers who would be allowed to wake up a home network during night-time.

The time to restore the access line connectivity is technology-dependent. In case of ADSL, due to required line training that can be in the order of 30 seconds. In the case of VoIP using SIP, this process can e.g. be executed in case an incoming call via a SIP INVITE message is signaled and the local policies detected that the caller number is compliant to the locally installed whitelist.

3) Reinstalling a Service

When re-installing a service, the following steps will be executed:

1) Wake up the HGW 4 and the access line
2) Attach the HGW 4 back to the home network 3 using the same IP address as used before putting it to low power mode
3) Move the service module's (possibly changed) data/state back to the HGW 4
4) Turn off the delegated service, turn on the original service
5) Forward the message to the service in the HGW 4

After the last step, service connectivity is given again between the HGW 4 and NGN-based service 5. The HGW 4 executes normal operation. In case subtended devices such as local VoIP phones need to be turned on, it performs this action based on existing methods such as "wake on LAN". In the case of VoIP using SIP, the HGW 4 would receive the SIP INVITE message, locate the terminal 2 and forward or execute the request.

4) Use Cases

Although described with a SIP-based use case, the method according to the present invention does not only apply to VoIP. Other services such as emergency warnings can also benefit. In the case of such warnings, it is advisable depending on the local specifics not to power down devices but to possibly just run them in low power modes for fast re-establishment of the services. This is especially required in the xDSL use case where a re-training might be needed.

The delegated service may be able to inform the requesting service in the operator network about it being just the delegate and may request to call back after a certain amount of time when the home network has woken up and the original service is available again. Machine-to-machine (M2M) communication can benefit from such procedures.

Transferred states can include more than a session state of the service. They may also contain policies or characteristics of in-home devices. An example would be in a way that a household has put the washing machine in a "wait state" in order to get the washing done during night-time without specifying exactly when the machine should start. After the home gateway has went to sleep mode and transferred the related service to the access node, upon an incoming "Water&Energy consumption available" message, the delegated service checks if it should listen to the request based on the transferred local policies. If so, it checks if there was a pending job included in the state data. In case there was one, it wakes up the home gateway and forwards the request to the original service which then starts the washing machine. Transferring the pending washing machine request only to the delegated service in the access node preserves privacy in a sense that e.g., the electrical company that issued the availability message does not need to know if a task was pending in the respective household.

Although highlighting the implementation in an MSAN/DSLAM, the procedures can also be implemented in a BRAS/IP edge router. Moreover, a third case is possible where the MSAN is in the layer 2 tunnel path towards the BRAS and can take over on behalf of the HGW. This will require also using the HGW's MAC address. Since all MAC tables in the aggregation network point to this specific MSAN, this is not an issue. Furthermore, the MSAN needs to take over network attachment specific tasks such as keepalives, etc. This would be just another service implementation.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for service management for terminals with broadband connections:
   the method wherein said terminal is connected through a home gateway to at least one service connected in an operator network, wherein the at least one service is an application, wherein said home gateway, which is an original service host, is attached to an access node of said operator network, and further including,
   monitoring whether said terminal is temporarily not using said at least one service,
   outsourcing said at least one service and transferring its current status and data to said access node or an associated entity, denominated a delegated service host, so that, as a result of said outsourcing, the delegated service host takes over said at least one service on behalf of the original service host, and
   tearing down the connection between said home gateway and said access node while operating said at least one service in said delegated service host.

2. Method according to claim 1, wherein said terminal and/or said home gateway are powered down or run in a low power mode after said service has been delegated to said delegated service host.

3. Method according to claim 2, wherein a local service module is provided that maintains said terminal's connection to said operator network.

4. Method according to claim 1, wherein a local service module is provided that maintains said terminal's connection to said operator network.

5. Method according to claim 1, wherein said delegated service in said delegated service host answers requests from said operator network on behalf of the temporarily unavailable service in said home gateway.

6. Method according to claim 1, wherein said delegated service in said delegated service host rejects requests from said operator network on behalf of the temporarily unavailable service in said home gateway on the basis of whitelists and/or blacklists.

7. Method according to claim 1, wherein said delegated service in said delegated service host requests a requesting entity on behalf of the temporarily unavailable service in said home gateway to call back.

8. Method according to claim 1, wherein an identifier is included in messages sent from said delegated service on behalf of the temporarily unavailable service in said home gateway, said identifier indicating that a different entity—delegated service host—has taken over said service on behalf of said original service host.

9. Method according to claim 1, wherein local policies and/or filters are provided for detecting within said delegated service whether interaction with said original service host is required and/or desirable.

10. Method according to claim 1, wherein policy rules are implemented in the delegated service host for controlling the re-establishing of the connection between said home gateway and said access node dependent on the occurrence of specific events.

11. Method according to claim 1, wherein, in connection with tearing down the connection, assigned IP addresses are delegated back to said access node, wherein changes of IP address assignment are handled accordingly in the service.

12. Method according to claim 1, wherein, in connection with re-establishing the connection, said home gateway takes the assigned IP address with it.

13. Method according to claim 1, wherein possible targets for said delegated service host are discovered depending on requirements of said service.

14. Method according to claim 1, wherein an entity is selected for said delegated service host that is located at a point in said operator network where all or at least all packets being relevant for said terminal's local network are passing.

15. System for service management for terminals with broadband connections, comprising:
wherein said terminal is connected through a home gateway to at least one service connected in an operator network, wherein said at least one service is an application, wherein said home gateway, which is an original service host, is attached to an access node of said operator network,
monitoring means for monitoring whether said terminal is temporarily not using said at least one service,
outsourcing means for outsourcing said at least one service and transferring its current status and data to said access node or an associated entity, denominated a delegated service host, so that, as a result of said outsourcing, the delegated service host takes over said at least one service on behalf of the original service host, and
a mechanism for tearing down the connection between said home gateway and said access node while operating said at least one service in said delegated service host.

16. System according to claim 15, including a local service module that maintains said terminal's connection to said operator network.

17. System according to claim 16, wherein said access node is represented by an MSAN/DSLAM (Multiservice Access Node/Digital Subscriber Line Access Multiplexer) with a physical access line being established between said home gateway and said access node.

18. System according to claim 15, wherein said access node is represented by an MSAN/DSLAM (Multiservice Access Node/Digital Subscriber Line Access Multiplexer) with a physical access line being established between said home gateway and said access node.

19. System according to claim 15, wherein said access node is represented by a BRAS (Broadband Remote Access Server) with the traffic between said home gateway and said access node being tunneled via said BRAS.

20. System according to claim 15, wherein said access node is represented per service depending on the used service overlay network by either one or more BRASes (Broadband Remote Access Server) or one or more MSANs/DSLAMs.

* * * * *